S. M. FORD.
MACHINE FOR MAKING LATH BOARD.
APPLICATION FILED MAY 11, 1917.
1,251,879.
Patented Jan. 1, 1918.
2 SHEETS—SHEET 1.
Fig.1
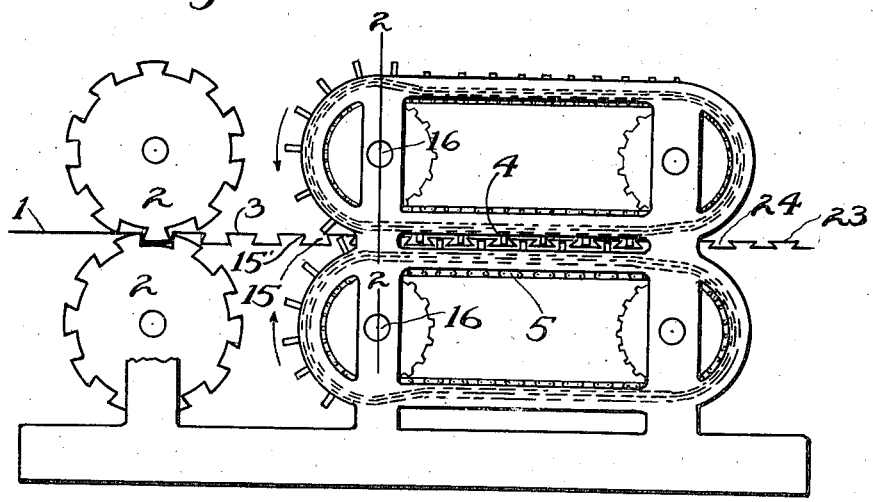
Fig.2
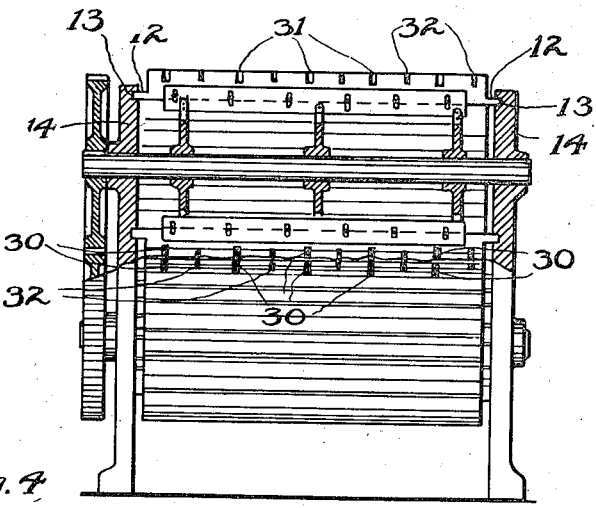
Fig.3  Fig.4
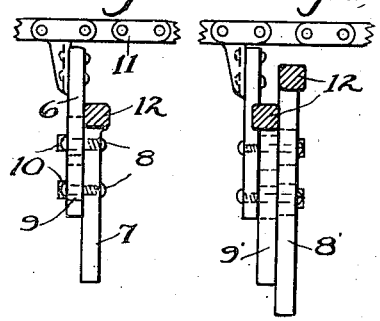
Fig.5
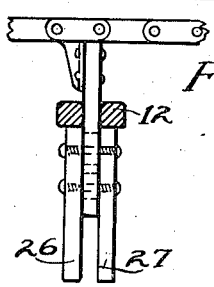
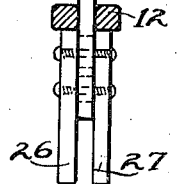
Inventor:
Silas M. Ford
by C. D. Enochs
Attorney

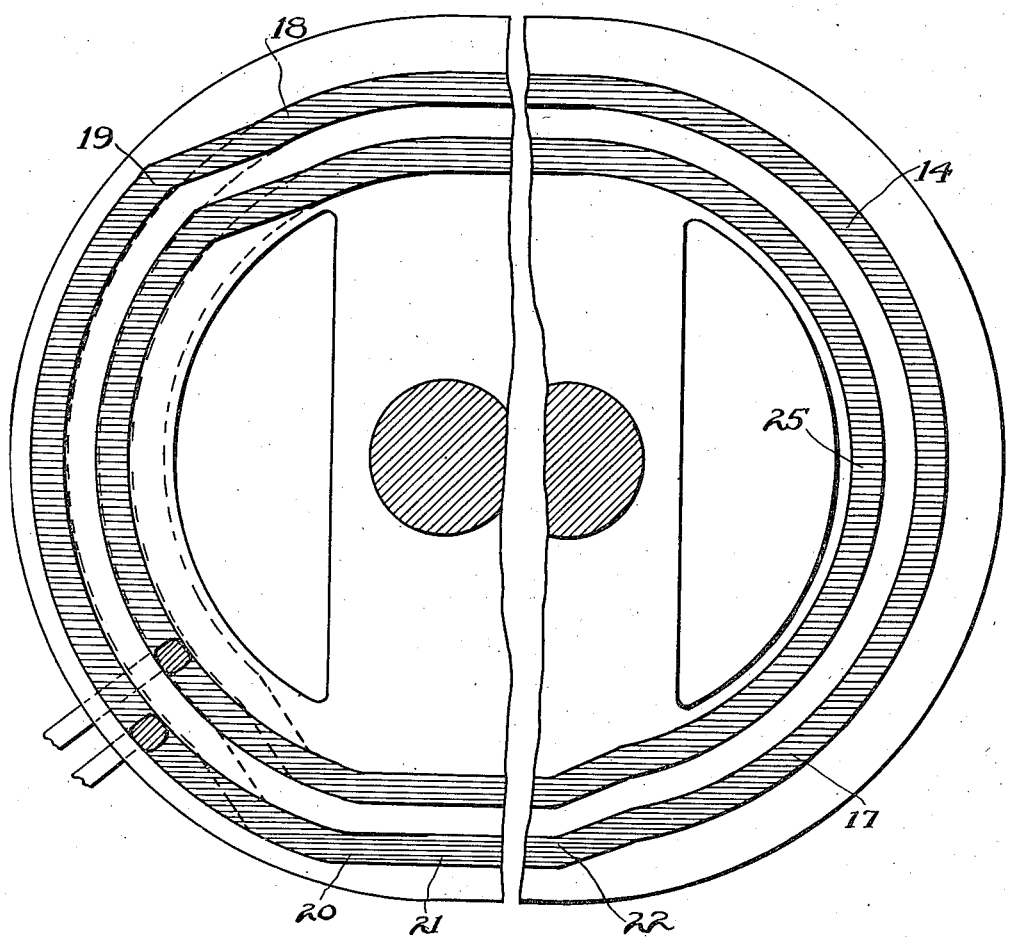

UNITED STATES PATENT OFFICE.

SILAS M. FORD, OF ST. PAUL, MINNESOTA.

MACHINE FOR MAKING LATH-BOARD.

1,251,879.  Specification of Letters Patent.  Patented Jan. 1, 1918.

Application filed May 11, 1917. Serial No. 168,056.

*To all whom it may concern:*

Be it known that I, SILAS M. FORD, a citizen of the United States, and a resident of St. Paul, in the county of Ramsey and State of Minnesota, have invented certain new and useful Improvements in Machines for Making Lath-Board, of which the following is a specification.

One object of my invention is to provide improved means for forming material from a rectangular or dovetailed shape into a closer dove-tailed shape.

Another object of my invention is to provide in a gathering chain, means for extending and withdrawing the gathering slats at predetermined points.

Another object of my invention is to provide in a gathering chain, a slidable gathering slat and means for moving the slidable gathering slat radially at predetermined points.

With these and incidental objects in view, the invention consists of certain novel features of construction and combination of parts, the essential elements of which are hereinafter described with reference to the drawings which accompany and form a part of this specification.

In the drawings, Figure 1 is a side elevation of a machine embodying my invention; Fig. 2 is a section taken on the line 2—2, Fig. 1; Fig. 3 is an enlarged detail of my preferred form of gathering slat; Fig. 4 is a modification of the form shown in Fig. 3, and Fig. 5 is a further modification of the gathering slat shown in Fig. 3; while Fig. 6 is an enlarged view of the cams controlling the radial motion of the slats.

The machine illustrated in the drawings, embodying my invention, is somewhat similar to that disclosed in my copending application for machine for making lath board; Serial No. 96,259, filed May 8, 1916, and the general description of the machine will not be enlarged on in this application but only the improvements which are claimed herein.

The paper, or other suitable material, 1, Fig. 1, is formed by any suitable means into a somewhat dovetailed shape as at 3 in which shape it is acted upon by a pair of gathering chains 4 and 5 in the same general manner as described in my copending application aforesaid.

However, the gathering chain is in this case not used to form the material from a rectangular corrugation to an acute dovetailed shape, but is rather made to slightly increase the dovetailed shape only and serves mainly as a guide or gage for holding the material in the shape in which it is already formed while certain other processes are carried out.

In place of the slats shown in my copending application and illustrated conventionally in Fig. 1, I provide slats as shown in Fig. 3.

Referring to Fig. 3, the slat 6 would be carried by the chain in the same manner as is the slat in my copending application.

Slidably mounted on the slat 6 is a sliding slat 7, in which is mounted a set of bolts or screws 8 which pass through slots 9 provided for that purpose in the slat 6, and nuts 10 keep the slat in a plane parallel to that of the slat 6.

It is evident that with this construction the slat 7 may slide to and from the chain 11 bearing on the slat 6.

The sliding slat 7 has lugs 12 projecting therefrom, as better shown in Fig. 2, and these lugs travel in grooves 13 cut in the frame members 14 to control the radial position of the slats.

Referring to Fig. 1, the dimensions of the slats 6 and 7 are such that the extreme outward edge of the slat 7 in its extended position will engage one of the corrugations of the paper as at 15, but the distance from the extreme end of the slat 7, (when extended), to the chain 11 is so great that as the slats travel in the direction of the arrows, they would tear the paper as they approached the center line of the shafts 16.

To obviate this possibility, the grooves 13 serve as cams to gradually withdraw the extended slats 7 as they approach the center line of the shafts 16 so that when they reach this center line they will just clear the bottom of the corrugations of the paper.

Referring to Fig. 6, the slot 14 from the point 17 to the point 18 will carry the slats in their restracted position. Between the points 18 and 19 the slots will extend the slats outwardly so that as they travel from 19 to 20 they will be in their extended position and will substantially reach forward to take hold of the corrugations of the material as early as possible.

Passing from the point 20 to 21 the slots serve to draw the slats to their retracted position, and passing from the points 22 to 17 the slats are drawn inwardly to a recessed position so they are quickly withdrawn from the corrugations of the paper leaving it free in a dovetailed formation as shown at 23, Fig. 1.

Under certain conditions of operation, I deem it advisable to modify the action of the slats as they pass from the point 18 to 20.

If the radius sweep of the slats was large in comparison with the length of the recesses of the corrugations, the edges of the slats, as they swing downwardly to engage at the point 15, strike the forward corner of the corrugations at 15' instead of the rearward corner 15.

To obviate this, I form the cams as shown dotted in Fig. 6, so that the slats are retained in their retracted position until just prior to the time they reach the point 15, Fig. 1.

At this point they are cammed quickly into their extended position and are in fact extended radially into the corrugations instead of swinging into them as described with the other style of cam slot.

The slats are withdrawn in the same manner as heretofore described, and the only difference in the cam or in the travel of the slats is between the points 18 and 20.

In place of a single sliding slat 7 I may use a double slat comprised of parts 8' and 9', Fig. 4, the slat 8' engaging the corrugations first as it extends beyond the slat 9', and as the thickness of the slat is less than the space 24, Fig. 1, it can enter the corrugations of the paper at 3 at a sharp angle.

As the slats 8' approach the line between the shafts 16 the second sliding slat 9' also enters the corrugations at 3, and both of the slats are gradually retracted as the line between shafts 16 is approached.

The slats are controlled by the cam formed by the groove 25, Fig. 6, in a manner as heretofore described for the slat 7, and as an alternate construction I may also employ the double sliding slats 26 and 27, Fig. 5, which will be controlled by cams as already described.

Referring to Figs. 1 and 2, I may also employ a set of guides 30 similar to those described in my copending application aforesaid, slots being provided in the sliding slats as shown at 31, and smaller slots 32 are also provided for the guidance of the stiffening wires which may be inserted as described in the aforenamed copending application.

While I have described my invention and illustrated it in several designs, I do not wish it understood that I limit myself to these constructions, as it is evident that the invention may be varied in many ways within the scope of the following claims.

Claims:

1. In a machine for making lath board, a gathering chain having fixed slats carried thereon, and slidable slats mounted on said fixed slats.

2. In a machine for making lath board, a gathering chain having fixed slats thereon, and slidable slats carried by said fixed slats and mounted for motion at right angles to said chain.

3. A gathering chain comprising in combination a pair of sprocket wheels, a sprocket chain carried by said sprocket wheels, fixed slats on said sprocket chain, and slidable slats carried by said fixed slats.

4. In gathering means for making lath board, the combination of a pair of sprocket wheels, a chain carried by said sprocket wheels, fixed slats mounted on said chain, slidable slats mounted on said fixed slats, and cams for controlling the sliding motion of said slidable slats.

5. In a machine for making lath board, a gathering chain, fixed slats on said gathering chain, movable slats associated with said fixed slats, and means for controlling the position of said movable slats.

6. In a machine for making lath board, a pair of frame members, a pair of shafts journaled in said frame members, a sprocket wheel on each of said shafts, a sprocket chain carried by said sprocket wheels, a series of fixed slats carried by said chain, movable slats mounted on said fixed slats and having a lug extending from one end of each of said movable slats, and a cam carried by one of said frame members for controlling the position of said movable slats.

7. In a machine for making lath board, a gathering chain comprising in combination a frame member, a flexible chain having fixed slats thereon, slidable slats mounted on said fixed slats, cams on said frame member for controlling the motion of said slidable slats, one of said cam members being so timed as to quickly extend the slats in synchronism with the corrugations of suitable material fed to said gathering chain.

SILAS M. FORD.